US012106208B2

(12) United States Patent
Pan et al.

(10) Patent No.: US 12,106,208 B2
(45) Date of Patent: Oct. 1, 2024

(54) ONLINE NEURON CLASSIFICATION METHOD BASED ON NEUROMORPHIC COMPUTING

(71) Applicant: ZHEJIANG UNIVERSITY, Hangzhou (CN)

(72) Inventors: Gang Pan, Hangzhou (CN); Yu Qi, Hangzhou (CN); Hang Yu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/267,091

(22) PCT Filed: Dec. 23, 2022

(86) PCT No.: PCT/CN2022/141216
§ 371 (c)(1),
(2) Date: Jun. 13, 2023

(87) PCT Pub. No.: WO2024/016590
PCT Pub. Date: Jan. 25, 2024

(65) Prior Publication Data
US 2024/0273347 A1    Aug. 15, 2024

(30) Foreign Application Priority Data

Jul. 20, 2022   (CN) .......................... 202210849758.7

(51) Int. Cl.
G06N 3/063    (2023.01)
G06N 3/04    (2023.01)

(52) U.S. Cl.
CPC .............. *G06N 3/063* (2013.01); *G06N 3/04* (2013.01)

(58) Field of Classification Search
None
See application file for complete search history.

(56) References Cited

U.S. PATENT DOCUMENTS 9,449,225 B2 *  9/2016  Ginosar .................. G06F 18/00
2019/0197406 A1   6/2019  Darvish Rouhani et al.

FOREIGN PATENT DOCUMENTS

CN    113378737        9/2021
CN    113378737 A  *  9/2021

OTHER PUBLICATIONS

Kumar et al. "Power-efficient spike sorting scheme using analog spiking neural network classifier" (Jan. 2021) (Year: 2021).*

(Continued)

*Primary Examiner* — Alexey Shmatov
*Assistant Examiner* — Beatriz Ramirez Bravo
(74) *Attorney, Agent, or Firm* — Jiwen Chen; Joywin IP Law PLLC

(57) ABSTRACT

The present invention discloses an online neuron spike sorting method based on neuromorphic computing, which converts neuron spike signals collected from the cerebral cortex into spike signals through field coding, classifies different waveforms and corresponding time stamps by means of spiking neural networks, and realizes online neuron spike sorting; at the same time, the online update method of spiking neural network is used to adapt to the online changes of neuronal spike waveform and improve the accuracy of long-term online neuronal spike sorting. This method has fast computational speed, which can improve the speed of spike sorting process, maintain high consistency in classification on different datasets, and facilitate the deployment of implanted chips.

4 Claims, 2 Drawing Sheets

(56) References Cited

OTHER PUBLICATIONS

Zhu, Zhengfei, "Research on the Neural Spike Detection and Sorting Algorithms", China Excellent Master Degree Thesis, Jun. 13, 2019, (16 pgs) with English Translation (24 pgs).

Anand, Kumar M. et al., "Power-efficient Spike Sorting Schedme Using Analog Spiking Neural Network Classifier", ACM J on Emerging Technology in Computing Sys, Jan. 31, 2021 (29 p).

Thilo et al., "Spiking neural Networks Based on OxRAM Synapses for Real-Time Unpervised Spike Sorting", Frontiers in neuroscience, Oct. 3, 2016 (12 p).

\* cited by examiner

ONLINE NEURON CLASSIFICATION METHOD BASED ON NEUROMORPHIC COMPUTING

This is a U.S. national stage application of PCT Application No. PCT/CN2022/141216 under 35 U.S.C. 371, filed Dec. 23, 2022 in Chinese, claiming priority of Chinese Application No. 202210849758.7, filed Jul. 20, 2022, all of which are hereby incorporated by reference.

FIELD OF TECHNOLOGY

The present invention relates to the field of electroencephalogram (EEG) signal spike sorting and decoding, in particular to an online neuron spike sorting method based on neuromorphic computing.

BACKGROUND TECHNOLOGY

Spike sorting is a complex but essential step in neural signal data processing and analysis. Monitoring the activity of individual neurons helps us better understand and analyze the behavioral mechanisms of the brain. The neural signals usually recorded with electrodes contain discharge activity from several nearby neurons and background noise, therefore, the task of spike sorting is to separate the discharge activity of individual neurons from each other and background noise, and then use the activity of individual neurons for further analysis in neuroscience.

In order to understand the problem of spike sorting, scientists have proposed various methods for decades, from manual classification to computer-aided semi-automatic classification methods, and finally to fully automated algorithms.

Usually, manual classification distinguishes spikes from a visual classification perspective. With the development of collection devices and the emergence of large-scale integrated electrode arrays, artificial spike sorting has become increasingly time-consuming and labor-intensive. Some electrode devices even include tens of thousands of electrode channels, which completely exceeds the limit of manual classification. In addition, the results of artificial spike sorting are influenced by the subjectivity of classification experts, and there are differences in the consistency of results obtained by different experts.

To alleviate the above problems, neuroscientists use automated software and algorithms to improve the accuracy and consistency of spike sorting.

From the perspective of machine learning, spike sorting mimics the behavior of human experts and classifies different neuronal activities by distinguishing waveforms. Currently, a large number of methods based on features are used to enhance the characteristics of spike waveforms, such as principal component analysis, wavelet decomposition, Laplace feature maps, etc. However, considering the changes in spike waveform and noise interference, most of them are usually inaccurate, so they are mainly used as auxiliary steps to provide rough classification results to accelerate the manual classification process, namely semi-automatic spike sorting methods.

Ideally, spike sorting should be an automatic, plug and play, and highly robust process that can correct classification errors caused by probe drift or cell deformation, and can be used for long-term recording. Currently, neuroscientists are able to place thousands of probes into the brain to simultaneously record neuronal activity. But with the explosive growth of the number of electrode channels, how to transmit massive signals through limited bandwidth has also become a bottleneck. An ideal solution is to directly process spike sorting near the brain and only transmit the classification results. However, the brain is very sensitive to temperature, and the heat generated by traditional chip operation can cause irreversible damage to tissues. Therefore, low-power neural chips are a feasible choice, and spike sorting algorithms based on neural chip morphology are expected to solve this problem and achieve intracranial brain computer interfaces.

SUMMARY OF THE INVENTION

The present invention provides an online neuron spike sorting method based on neuromorphic computing, for the problems of slow manual classification speed, inconsistent classification results from different experts, and the need for a long time in spike sorting, it improves the speed of spike sorting process to some extent, maintains high consistency in classification on different datasets, and facilitates the deployment of implanted chips.

An online neuron spike sorting method based on neuromorphic computing, comprising the following steps:
  (1) obtaining original multi-channel neural signals, removing low-frequency local field potentials through bandpass filter, and performing whitening preprocessing and artifact removal on each channel's neural signals;
  (2) detecting and aligning candidate spikes on each signal channel, specifically by using a nonlinear energy operator to calculate the energy intensity of each position in the discrete signal, a time window exceeding the threshold is determined as a candidate spike, and then aligning the candidate spike based on the spike position;
  (3) constructing a spiking neural network, with the first layer being the perception layer and the second layer being the cognitive layer, each neuron on the cognitive layer connects to the perception layer neurons in a fully connected manner and dynamically updates the connecting synapses;
  (4) the perception layer of the spiking neural network is used to spike code the candidate spike, and the discrete signal of each time point of the input candidate spike is mapped to a group of spike sequences in the form of Gaussian Receptive field coding;

Neurons on the cognitive layer respond to different spike sequence inputs, and updating the connecting synapses between the activated neurons with the corresponding neurons in the perception layer based on the winner-take-all mechanism; when the cumulative voltage of neurons in the cognitive layer exceeds the voltage threshold, the neurons in the cognitive layer output the spike sequence as a time stamp sequence in response to the action potential of different cells;
  (5) for the original neural signal corresponding to the time stamp sequence, the spike and noise are divided according to a pre-set threshold, and each channel reconstructs waveforms from different cells based on the time stamp sequence output by the spiking neural network.

Preferably, in the step (1), the bandpass filter adopts a 3rd order Butterworth filter with a bandpass frequency of 300-3000 Hz.

In the step (2), using a nonlinear energy operator to calculate the energy intensity of each position in the discrete signal, the formula is:

$$\psi[x(n)] = x^2(n) - x(n+1) \cdot x(n-1)$$

wherein, x(n) is the sampling point of the n time waveform.

When aligning the candidate spike based on the spike position, the spike position is first interpolated through upsampling, and after realignment, the waveform is downsampled to its original length.

In the step (4), the form of Gaussian Receptive field coding is as follows:

$$I_{(x,y,t)}=P_{\mu,\delta}(S_t)$$

Wherein, $\mu$ is the central position of neurons in the Receptive field, $\delta$ is the width of neurons in the Receptive field, $S_t$ is the signal sequence at time t, $I_{(x,y,t)}$ is the spike firing of the neurons (x, y) in the perception layer at time t, and P is the Poisson process of the Gaussian Receptive field.

The winner takes all mechanism is: when a neuron is activated, other neurons are suppressed and not updated, only the weight of connecting synapses between the activated neuron with the neurons in the perception layer is enhanced or reduced.

Updating the connecting synapses between the activated neurons with the corresponding neurons in the perception layer, the neuron selection method is as follows:

$$\dot{\epsilon} = \max_{\epsilon} z(\epsilon, t)$$

Wherein, $\dot{\epsilon}$ is the neurons in the cognitive layer for selected execution updates, $z(\epsilon, t)$ is the voltage value of neurons in the cognitive layer at time t.

In the initial state, all weight values are initialized. Utilizing the Hebb learning rule to force neurons to find waveforms of interest. Each neuron in the cognitive layer is fully connected to the perception layer, and the weights of these synapses are initialized to zero. When outputting neuron triggers, the Hebb learning rules are applied to the input synapses.

When updating the connecting synapses between the activated neurons with the corresponding neurons in the perception layer, the weight update method of the connecting synapses between the two layers is as follows:

$$\hat{\omega}_{t+1} = \begin{cases} \min(\omega_t + \tau_{stdp+}, \omega_{max}), & \text{if presynapses firing} \\ \max(\omega_t - \tau_{stdp-}, \omega_{min}), & \text{if postsynapses firing} \end{cases}$$

wherein, $\hat{\omega}_{t+1}$ is the synaptic weight at t+1 time after update, $\omega_t$ is the synaptic weight at time t before the update, $\tau_{stdp+}$ is the constant for postsynapses firing, $\tau_{stdp-}$ is the constant for presynapses firing, $\omega_{max}$ is the maximum value of synaptic weight, $\omega_{min}$ is the minimum value of synaptic weight.

Due to the displacement between the probe and the body tissue, the neuron waveforms may undergo slight and permanent deformation. In the method assumption of the present invention, the deformation of continuous waveforms occurs between adjacent input neurons, so the continuous deformation can be reflected on the weight map of the cognitive layer.

Comparing with the prior art, the present invention has the following beneficial effects:
1. the present invention does not require pre training or template provision, and can be plug and play.
2. the online classification process of the present invention does not require manual intervention.
3. the present invention can be deployed on neuromorphic chips to achieve ultra-low power spike sorting.

DETAILED DESCRIPTION OF THE EMBODIMENTS

The following is a further detailed description of the present invention in conjunction with the accompanying drawings and embodiments. It should be noted that the embodiments described below are intended to facilitate the understanding of the present invention without any limiting effect.

This example uses a data set collected from the mouse hippocampus, which contains intracellular and extracellular records from the same neuron. A portion of this dataset has been tested in various laboratories to test different neural clustering algorithms.

In one of the datasets, it is found that the waveform of the real label gradually scaled over time, suggesting that this is due to the increasing distance between the extracellular electrode and neurons during the collection process. However, from the perspective of waveform, it is difficult to cluster spike sorting at different time points on the same real label into the same label.

The Hebb learning rule is applied to the synapses where each postsynaptic spike occurs from the perception layer to the cognitive layer, which means that if the presynaptic spike occurs alone, no changes will occur. Although the network can automatically learn the emergence and transformation peaks, some hyperparameter need to be set for Hebb learning process before running. A reasonable set of parameters can enable the entire network to quickly learn features from different waveforms without over clustering. The present invention attempted different ratios of plasticity parameters on some public datasets, considering recognition speed and accuracy, and ultimately selected the parameters $\tau_{stdp+}$=0.2 and $\tau_{stdp-}$=0.1.

In addition, it is decided to use the following parameters: Imax upper limit of Receptive field 200; $I_{min}$:lower limit of Receptive field—200; $\beta$: Field neuron form factor 2; $d_r$: the average distance between adjacent Receptive field 13; $\tau_{stdp+}$: short term plasticity time presynaptic constant 0.2; $\tau_{stdp-}$: short term plasticity time postsynaptic constant 0.1; $th_d$: neuron discharge threshold 3.

Figure 1:
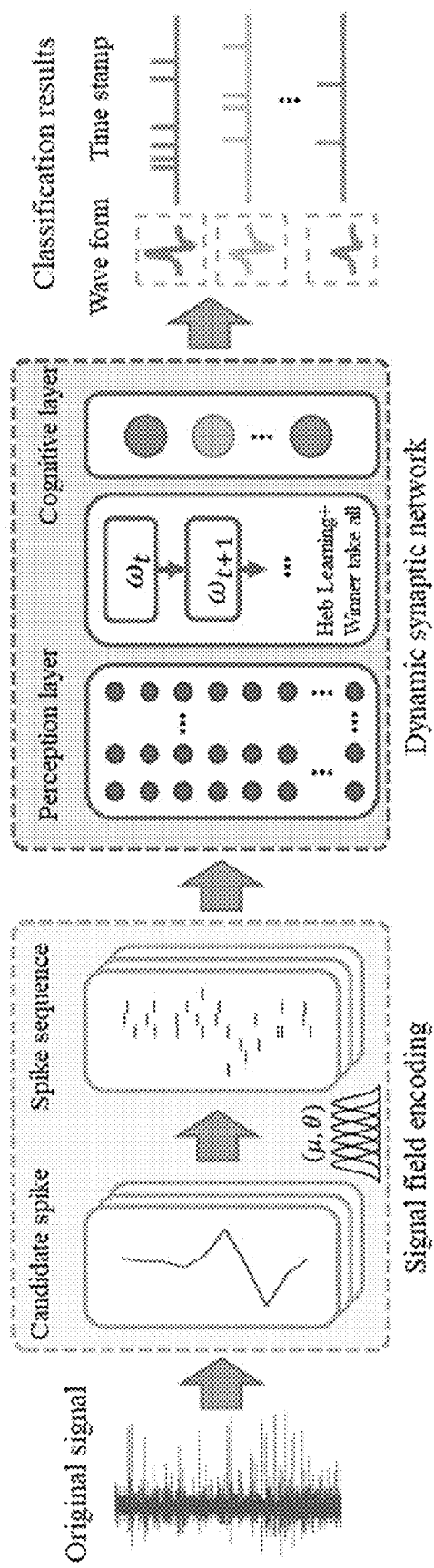
FIG. 1 is a paradigm flowchart of an online neuron spike sorting method based on neuromorphic computing of the present invention.

As shown in FIG. 1, the online neuron spike sorting method based on neuromorphic computing, comprising the following steps:
1. preprocessing electroencephalogram: obtaining original electroencephalogram, removing low-frequency local field potentials through bandpass filter, the 3rd order Butterworth filter with a bandpass frequency of [300 Hz, 3000 Hz] was used; since only one channel in this dataset has a real label, there is no need for whitening process; subsequently, removing the artifacts. The signal is finally standardized to the range [−1,1].
2. detecting the candidate spikes: performing the detection of the candidate spikes on each signal channel, the present invention used the nonlinear energy operator (NEO) $\psi$ to calculate the energy intensity of each position in the discrete signal, the formula is:

$$\psi[x(n)] = x^2(n) - x(n+1) \cdot x(n-1)$$

wherein, x(n) is the sampling point of the n time waveform. Here, the threshold is set to 0.05, and the first 31 and last 32 energy operators that exceed the threshold are considered as candidate spikes at a total of 64 time points when the window is cut off.

3. aligning spikes: peak alignment refers to aligning each peak with its maximum amplitude point (in some cases, the maximum value of the peak may be the minimum value of the waveform). Due to the fact that the peak of the waveform only reaches a very short time and is usually located between the time points of signal sampling, the peak of the waveform cannot be accurately measured. To avoid peak misalignment caused by low sampling, the maximum peak position is interpolated using a cubic spline waveform. After realigning, for the convenience of subsequent calculations, a 256 length signal is intercepted with a peak position of 100, and all points are scaled 100 times as network inputs.

4. inputting signal field encoding: the neural signal transmitted within the sliding time window before the current time point is encoded into a spike signal and transmitted to the subsequent spiking neural network. The network layer of this layer is called the "perception layer", which maps continuous input signals to a group of spike sequences in the form of Gaussian Receptive field coding. This specific neural coding technology is an extension of the sorting encoder, which allows the vector of real value elements to be mapped to a series of spike sequences. The Receptive field allows encoding continuous values by using a collection of neurons with overlapping sensitivity profiles.

Assuming the signal sequence $S_t$ at time t after preprocessing, $S_{\{t\}} = [s_{\{t_0\}}, s_{\{t_1\}}, s_{\{t_2\}}, \ldots, s_{\{t_k\}}]$ is derived from time $t_0$ to time $t_k$. The firing I of neurons (x, y) at time t is:

$$I_{(x,y,t)} = P_{\mu,\delta}(S_t)$$

where P is the Poisson process of the Gaussian Receptive field.

Each input variable is independently coded by a set of M one-dimensional Receptive field. Each $s_{t_k}$ is defined an interval $$[S_{min}^{s_{t_k}}, S_{max}^{s_{t_k}}],$$

where the interval is [−200,200]. Central position $\mu_i$ of neuron i in Gaussian Receptive field is calculated as:

$$\mu_i = S_{min}^n + \frac{2i - 3}{2} \cdot \frac{S_{max}^n - S_{min}^n}{M - 2}$$

width $\theta$ is calculated as:

$$\theta = \frac{1}{\beta} \cdot \frac{S_{max}^n - S_{min}^n}{M - 2}$$

wherein, $\beta=2$ controlling the width of each Gaussian Receptive field. Based on this dataset, we set the width $\theta$ is 10, therefore M=22.

5. spiking neural network classification: comprising two layers, the first layer is neurons in the perception layer, where only the input signal part is intercepted [81,140], so the size of the perception layer is 22×60. The second layer is the cognitive layer, which connects the first layer neurons in a fully connected manner and dynamically updates them. Here, the size of the cognitive layer is manually set to 9×1. The cognitive layer follows the winner-take-all (WTA) mechanism, where when a neuron is activated, other neurons are suppressed and not updated.

Neuron $\epsilon$ is an integral firing (IF) neuron, whose membrane potential at time t is controlled by the following equation:

$$z(\epsilon, t) = \sum_x^X \sum_y^Y I_{(x,y,t)} \cdot \omega_{(\epsilon,x,y)}$$

wherein, $I_{(x,y,t)}$ is the input spike sequence from the perception layer, which is the spike firing of the neurons in the perception layer (x, y) at time t; $\omega_{(\epsilon,x,y)}$ is the fully connected weight of a neuron E from the perception layer to the cognitive layer.

The selection of neurons in the cognitive layer based on the winner-take-all mechanism is:

$$\dot{\epsilon} = \max_\epsilon z(\epsilon, t)$$

$\dot{\epsilon}$ is the neurons in the cognitive layer for selected execution updates.

In the initial state, all weight values are initialized. Each neuron in the cognitive layer is fully connected to the perception layer. Every time the output neuron triggers a threshold, the Hebb learning rules are applied to the input synapses. Using this rule, the connection synaptic weights between two layers are updated through constant values $\tau_{stdp+}$ or $\tau_{stdp-}$:

$$\hat{\omega}_{t+1} = \begin{cases} \min(\omega_t + \tau_{stdp+}, \omega_{max}), & \text{if presynapses firing} \\ \max(\omega_t - \tau_{stdp-}, \omega_{min}), & \text{if postsynapses firing} \end{cases}$$

wherein, $\tau_{stdp+}=0.2$, $\tau_{stdp-}=0.1$, $\omega_{max}=1$, $\omega_{min}=0$.

when the cumulative voltage of neurons in the cognitive layer exceeds the voltage threshold $th_d=3$, the neurons in the cognitive layer output the spike sequence as a time stamp sequence in response to the action potential of different cells.

6. comparing the obtained time stamp sequence with real labels to verify the performance of the method.

Figure 2:
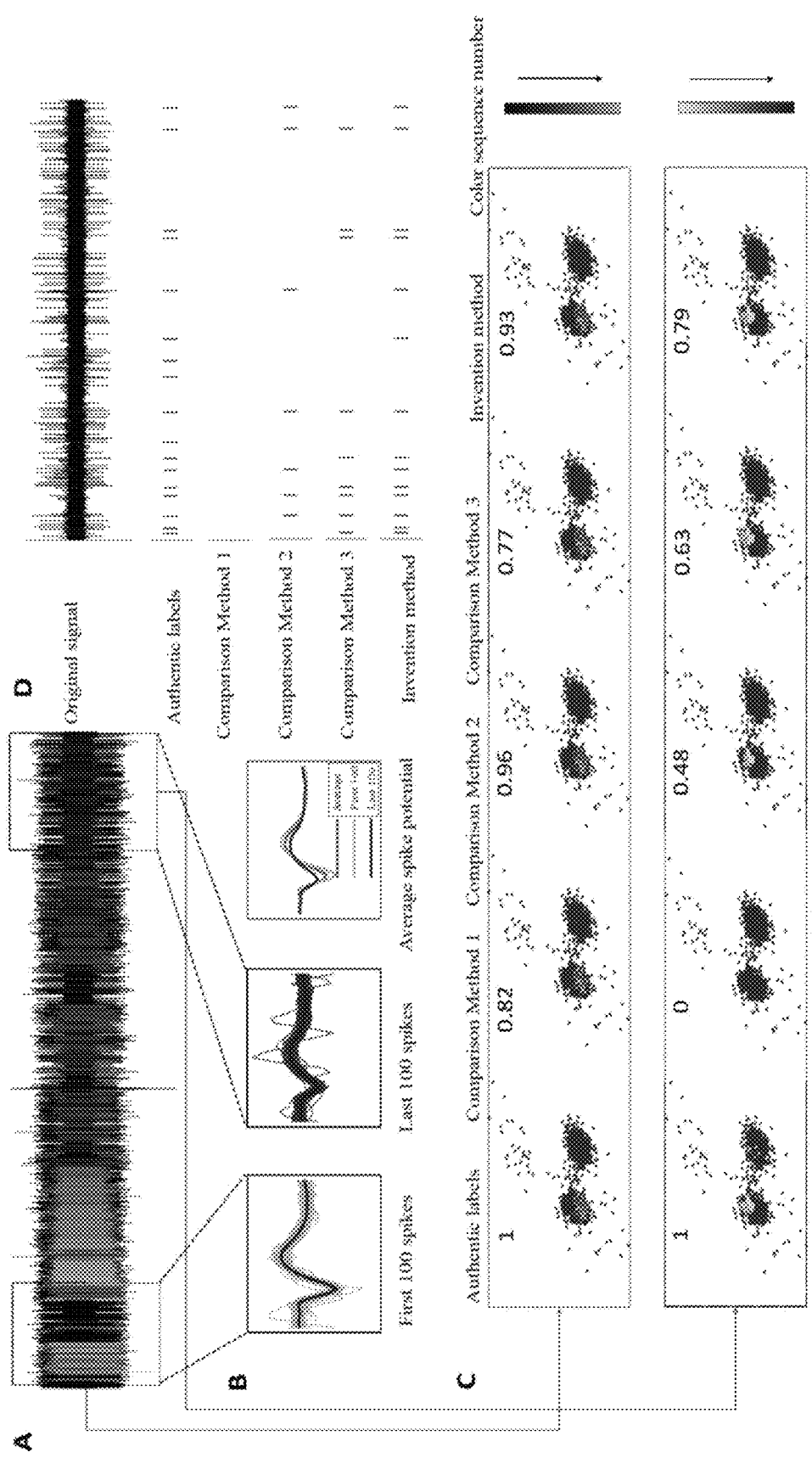
FIG. 2 shows the comparison of the effectiveness between the method of the present invention and the comparison method in a real dataset.

In order to demonstrate that this method can trace the same neuron, even if waveform changes occur over time, we selected a specific real dataset for experiments, as shown in FIG. 2. In this data, extracellular firing results are labeled based on intracellular firing, and the amplitude of the waveform is constantly shrinking overall. Drawing an average waveform using the spikes labeled with the first 100 and last 100 labels, and the difference between the two is usually not considered to be generated by the same neuron. In the first 100 spikes with the same label, this method performs similarly to the comparison method, however, on the last 100 spikes with the same label, due to the waveform scaling of the neuron over the time span, there is a difference between the starting waveform and the ending waveform. The comparison method usually cannot capture the changes in the intra class waveform well. Through the reduced dimensionality staining results, it can be seen that the spike results found by this method are closer to the real label, indicating that this method can track the waveform changes of the same neuron within a certain range.

The above embodiments provide a detailed explanation of the technical solution and beneficial effects of the present invention. It should be understood that the above are only specific embodiments of the present invention and are not intended to limit the present invention. Any modifications, supplements, and equivalent replacements made within the scope of the principles of the present invention should be included in the scope of protection of the present invention.

The invention claimed is:

1. An online neuron spike sorting method based on neuromorphic computing, comprising the following steps:
   (1) obtaining original multi-channel neural signals, removing low-frequency local field potentials through a bandpass filter, and performing whitening preprocessing and artifact removal on each channel's neural signals;
   (2) detecting and aligning candidate spikes on each signal channel, specifically by using a nonlinear energy operator to calculate the energy intensity of each position in the discrete signal, a time window exceeding the threshold is determined as a candidate spike, and then aligning the candidate spike based on the spike position;
   (3) constructing a spiking neural network, with the first layer being the perception layer and the second layer being the cognitive layer, each neuron on the cognitive layer connects to the perception layer neurons in a fully connected manner and dynamically updates the connecting synapses;
   (4) the perception layer of the spiking neural network is used to spike code the candidate spike, and the discrete signal of each time point of the input candidate spike is mapped to a group of spike sequences in the form of Gaussian Receptive field coding;
   neurons on the cognitive layer responding to different spike sequence inputs, and updating the connecting synapses between the activated neurons with the corresponding neurons in the perception layer based on the winner-take-all mechanism; when the cumulative voltage of neurons in the cognitive layer exceeds the voltage threshold, the neurons in the cognitive layer output the spike sequence as a time stamp sequence in response to the action potential of different cells;
   the form of Gaussian Receptive field coding is as follows:

$$I_{(x,y,t)} = P_{\mu,\delta}(S_t)$$

wherein, $\mu$ is the central position of neurons in the Receptive field, $\delta$ is the width of neurons in the Receptive field, $S_t$ is the signal sequence at time t, $I_{(x,y,t)}$ is the spike firing of the neurons (x, y) in the perception layer at time t, and P is the Poisson process of the Gaussian Receptive field;
   the winner-take-all mechanism is: when a neuron is activated, other neurons are suppressed and not updated, only the weight of connecting synapses between the activated neuron with the neurons in the perception layer is enhanced or reduced;
   updating the connecting synapses between the activated neurons with the corresponding neurons in the perception layer, the neuron selection method is as follows:

$$\dot{\epsilon} = \max_{\epsilon} z(\epsilon, t)$$

wherein, $\dot{\epsilon}$ is the neurons in the cognitive layer for selected execution updates, $z(\epsilon, t)$ is the voltage value of neurons in the cognitive layer at time t;
   in the initial state, all weight values are initialized, utilizing the Hebb learning rule to force neurons to find waveforms of interest, each neuron in the cognitive layer is fully connected to the perception layer, and the weights of these synapses are initialized to zero, when outputting neuron triggers, the Hebb learning rules are applied to the input synapses;
   when updating the connecting synapses between the activated neurons with the corresponding neurons in the perception layer, the weight update method of the connecting synapses between the two layers is as follows:

$$\hat{\omega}_{t+1} = \begin{cases} \min(\omega_t + \tau_{stdp+}, \omega_{max}), & \text{if presynapses firing} \\ \max(\omega_t - \tau_{stdp-}, \omega_{min}), & \text{if postsynapses firing} \end{cases}$$

wherein, $\hat{\omega}_{t+1}$ is the synaptic weight at t+1 time after update, $\omega_t$ is the synaptic weight at time t before the update, $\tau_{stdp+}$ is the constant for postsynapses firing, $\tau_{stdp-}$ is the constant for presynapses firing, $\omega_{max}$ is the maximum value of synaptic weight, $\omega_{min}$ is the minimum value of synaptic weight;
   (5) for the original neural signal corresponding to the time stamp sequence, the spike and noise are divided according to a pre-set threshold, and each channel reconstructs waveforms from different cells based on the time stamp sequence output by the spiking neural network.

2. The online neuron spike sorting method based on neuromorphic computing according to claim 1, wherein, in the step (1), the bandpass filter adopts a 3rd order Butterworth filter with a bandpass frequency of 300-3000 Hz.

3. The online neuron spike sorting method based on neuromorphic computing according to claim 1, wherein, in the step (2), using a nonlinear energy operator to calculate the energy intensity of each position in the discrete signal, the formula is:

$$\psi[x(n)] = x^2(n) - x(n+1) \cdot x(n-1)$$

wherein, x(n) is the sampling point of the n time waveform.

4. The online neuron spike sorting method based on neuromorphic computing according to claim 1, wherein, in step (2), when aligning the candidate spike based on the spike position, the spike position is first interpolated through upsampling, and after realignment, the waveform is downsampled to its original length.

* * * * *